United States Patent
Fukumura et al.

[19]

[11] Patent Number: 6,089,677
[45] Date of Patent: Jul. 18, 2000

[54] BRAKING FORCE CONTROL APPARATUS

[75] Inventors: Tomohiro Fukumura; Shinji Matsumoto, both of Yokohama, Japan

[73] Assignee: Nissan Motor Co., Ltd., Yokohama, Japan

[21] Appl. No.: 08/820,336

[22] Filed: Mar. 12, 1997

[30] Foreign Application Priority Data

Mar. 12, 1996 [JP] Japan ..................................... 8-054688

[51] Int. Cl.$^7$ ..................................................... B60T 8/00
[52] U.S. Cl. ............................................ 303/112; 303/167
[58] Field of Search .................................. 303/112, 113.4, 303/139, 140, 141, 146, 151, 166–169, 171–173, 186–190, DIG. 2, DIG. 6; 180/197; 364/426.015, 426.024, 426.026, 426.027, 426.028, 426.029, 426.036; 701/78, 82–84, 90

[56] References Cited

U.S. PATENT DOCUMENTS

| | | | |
|---|---|---|---|
| 4,811,993 | 3/1989 | Matsumoto et al. ............... | 303/112 |
| 4,981,190 | 1/1991 | Nakayama et al. .............. | 180/197 |
| 5,079,708 | 1/1992 | Brown ........................... | 364/424.05 |
| 5,163,530 | 11/1992 | Nakamura et al. ............... | 180/197 |
| 5,465,208 | 11/1995 | Mochizuki et al. .............. | 364/426.01 |
| 5,471,390 | 11/1995 | Sasaki .......................... | 364/424.05 |
| 5,564,796 | 10/1996 | Saito et al. ................... | 303/112 |
| 5,577,812 | 11/1996 | Hirano et al. .................. | 303/112 |
| 5,613,743 | 3/1997 | Kost et al. .................... | 303/165 |
| 5,628,378 | 5/1997 | Saito et al. ................... | 180/197 |
| 5,636,121 | 6/1997 | Tsuyawa et al. ................ | 364/426.01 |
| 5,737,714 | 4/1998 | Matsuno et al. ................ | 701/89 |

FOREIGN PATENT DOCUMENTS

| | | |
|---|---|---|
| 53-131382 | 11/1978 | Japan . |
| 4-151354 | 5/1992 | Japan . |
| 6-32217 | 2/1994 | Japan . |
| 7-81463 | 3/1995 | Japan . |

*Primary Examiner*—Chris Schwartz
*Attorney, Agent, or Firm*—Foley & Lardner

[57] ABSTRACT

An apparatus for use with an automotive vehicle supported on traction and follower road wheels to control the braking forces applied to the respective road wheels. A target vehicle deceleration is calculated based on a driver's force exerted to apply braking to the vehicle. Target braking forces required for the respective road wheels are calculated in a manner to achieve the target vehicle deceleration based on loads to be shared by the respective road wheels. Target brake torque for the respective road wheels are calculated based on the calculated target braking forces. Drive torque for the respective road wheels are calculated. The drive torque calculated for the respective traction road wheels are used to correct the corresponding target brake torque calculated for the respective traction road wheels so as to calculate target traction road wheel brake torque. The braking forces applied to the respective road wheels are controlled in a manner to achieve the target brake torque calculated for the respective follower road wheels and also to achieve the target traction road wheel brake torque calculated for the respective traction road wheels.

14 Claims, 9 Drawing Sheets

BRAKING FORCE CONTROL APPARATUS

BACKGROUND OF THE INVENTION

This invention relates to a braking force control apparatus for optimizing wheel braking of respective road wheels, separately.

For example, Japanese Patent Kokai Nos. 53-131382 and 4-151354 disclose braking force control apparatus of the type where the braking forces applied to the traction or drive road wheels that are driven by the vehicle engine are controlled independently of the follower or driven wheels that are not driven by the vehicle engine. These conventional apparatuses intend to ensure that the traction road wheels have the same braking efficiency as the follower road wheels by preventing the engine brake from being applied to the traction road wheels thereby keeping the skidding control performance of the traction road wheels free from the influence of the engine brake while the skidding control is performed to prevent the road wheels from being locked. With such conventional apparatus, however, a creep torque will act on the traction road wheels in the direction opposite to the direction of the engine brake torque thereby reducing the braking efficiency for the traction road wheels when the vehicle is being braked at low speeds with the accelerator pedal released. This tendency is increased particularly for vehicles of the type including an automatic transmission through which a drive torque is transmitted from an engine to the traction road wheels since a shift down occurs in the automatic transmission, causing a great change of traction wheel drive torque during travel of the vehicle at low speeds. Furthermore, the conventional apparatuses exert greater load on the associated road wheel braking system since the engine brake is not utilized.

It is proposed, in Japanese Patent Kokai No. 6-32217, to increase the road wheel braking force to compensate for the road wheel braking force reductions when a creep torque is produced and, in Japanese Patent Kokai No. 7-81463, to decrease the road wheel braking force to compensate for the road wheel braking force increases when an engine brake torque is produced. With these proposals, however, the braking force is decreased or increased uniformly for all of the road wheels. For example, if the braking force is increased uniformly for all of the road wheels when a creep torque is produced, excessive braking force will be applied to increase the tendency of the follower road wheels, which are free from the influence of the creep torque, to be locked, whereas braking fore insufficient for the creep torque will be applied to the traction road wheels. Such inbalanced application of braking force occurs not only between the traction and follower road wheels, but also between the left and right road wheels. This is true particularly when the vehicle is travelling on a road surface having a low friction factor or when the vehicle is turning.

SUMMARY OF THE INVENTION

Therefore, it is a main object of the invention to provide an improved braking force control apparatus which can control the braking forces to the road wheels according to the loads distributed to the respective road wheels in the presence of vehicle braking while minimizing the influence of the road wheel drive torque on the braking performance.

According to one aspect of the present invention, there is provided a braking force control apparatus for an automotive vehicle drive train including an engine and at least one traction road wheel driven by the engine, the apparatus comprising:

a source of braking fluid;
a hydraulic circuit fluidly disposed between said source of braking fluid and the at least one traction road wheel, said hydraulic circuit including an electromagnetic valve that controls supply of braking fluid to and discharge thereof from the at least one traction road wheel in response to a control signal to establish braking pressure applied to the at least one traction road wheel; and
a control unit operatively coupled with said sensor and said electromagnetic valve, wherein
said control unit determines a target braking force to be applied to the at least one traction road wheel in response to operator's brake demand;
said control unit determines a target brake torque in response to said determined target braking force and a drive torque applied to the at least one traction road wheel;
said control unit determines a desired braking pressure in response to said determined target brake torque;
said control unit developing said control signal in response to said determined desired braking pressure; and
said control unit applied said control signal to said electromagnetic valve to adjust braking pressure to said determined desired braking pressure.

According to another aspect of the present invention there is provided a braking force control apparatus for an automotive vehicle including an engine, at least one traction road wheel driven by the engine and at least one follower road wheel, the apparatus comprising:

a source of braking fluid;
a first hydraulic circuit fluidly disposed between said source of braking fluid and the at least one traction road wheel, said first hydraulic circuit including a first electromagnetic valve that controls supply of braking fluid to and discharge thereof from the at least one traction road wheel in response to a first control signal to establish braking pressure applied to the at least one traction road wheel;
a second hydraulic circuit fluidly disposed between said source of braking fluid and the at least one follower road wheel,
said second hydraulic circuit including a second electromagnetic valve that controls supply of braking fluid to and discharge thereof from the at least one follower road wheel in responses to a second control signal to establish braking pressure applied to the at least one follower road wheel; and
a control unit operatively coupled with said sensor and said first and second electromagnetic valves,
wherein
said control unit determines a first target braking force to be applied to the at least one traction road wheel in response to operator's brake demand;
said control unit determines a first target brake torque in response to said determined first target braking force and a drive torque applied to the at least one traction road wheel;
said control unit determines a first target braking pressure in response to said determined first target brake torque;
said control unit developing said first control signal in response to said determined first target braking pressure;
said control unit applies said first control signal to said first electromagnetic valve to adjust braking pressure to said determined first target braking pressure;
said control unit determines a second target braking force to be applied to the at least one follower road wheel in response to the operator's brake demand;
said control unit determines a second target brake torque in response to said determined second target braking force;

said control unit determines a second target braking pressure in response to said determined second target brake torque;

said control unit developing said second control signal in response to said determined second target braking pressure; and said control unit applies said second control signal to said second electromagnetic valve to adjust braking pressure to said determined second target braking pressure.

BRIEF DESCRIPTION OF THE DRAWINGS

The invention will be described in greater detail by reference to the following description taken in connection with the accompanying drawings, in which.

DETAILED DESCRIPTION OF THE INVENTION

Figure 1:
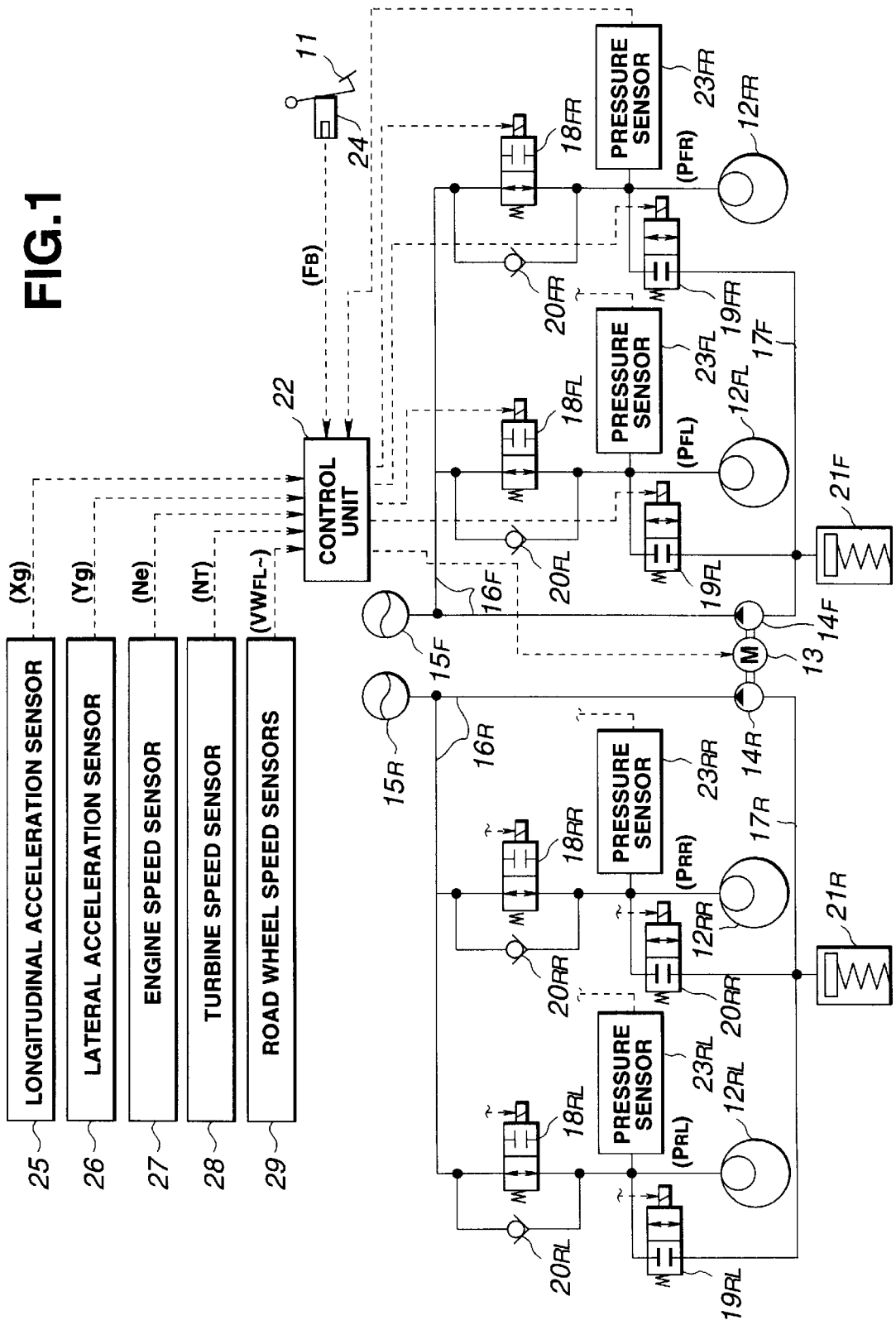
FIG. 1 is a schematic diagram showing one embodiment of a braking force control apparatus made in accordance with the invention.

With reference to the drawings, and in particular to FIG. 1, there is shown a schematic diagram of a braking force control apparatus embodying the invention. The invention will be described in connection with a rear-drive type automotive vehicle supported on a pair of front road wheels and a pair of rear road wheels. A drive torque is transmitted from an engine to the rear road wheels through an automatic transmission, a propeller shaft and a viscous coupling type differential gear. The front road wheels are associated with respective wheel cylinders $12_{FL}$ and $12_{FR}$ which are situated in front wheel brakes for application of brakes to the respective front road wheels. The rear road wheels are associated with respective wheel cylinders $12_{RL}$ and $12_{RR}$ which are situated in rear wheel brakes for application of brakes to the respective rear road wheels. The numeral 11 designates a brake pedal which is operated by the operator to provide an operator's demand for vehicle acceleration signal to a control unit 20. A motor 13 is driven on a command from the control unit 22 to operate front and rear road wheel pumps $14_F$ and $14_R$ so as to force braking fluid to respective accumulators $15_F$ and $15_R$.

The front road wheel pump $14_F$ has an exhaust or discharge port connected through a conduit $16_F$ to pressure increasing valves $18_{FL}$ and $18_{FR}$ and hence to the respective wheel cylinders $12_{FL}$ and $12_{FR}$. A check valve $20_{FL}$ is connected in parallel with the pressure increasing valve $18_{FL}$ to permit flow only toward the wheel cylinder $12_{FL}$ while preventing back flow. A check valve $20_{FR}$ is connected in parallel with the pressure increasing valve $18_{FR}$ to permit flow only toward the wheel cylinder $12_{FR}$ while preventing back flow. The pressure increasing valves $18_{FL}$ and $18_{FR}$, which are substantially the same in structure, are taken in the form of solenoid valves operable, on a control signal fed thereto from the control unit 22, to occupy one of two positions. The first or open position, illustrated in FIG. 1, is occupied in the absence of the control signal to increase the braking fluid pressure $P_{FL}$, $P_{FR}$ furnished to the corresponding one of the wheel cylinders $12_{FL}$ and $12_{FR}$. The second or closed position is encountered in the presence of the control signal to hold the braking fluid pressure in the corresponding wheel cylinder. The front road wheel pump $14_F$ has an intake or suction port connected through a conduit $17_F$ to pressure reducing valves $19_{FL}$ and $19_{FR}$ and hence to the respective wheel cylinders $12_{FL}$ and $12_{FR}$. The pressure reducing valves $19_{FL}$ and $19_{FR}$, which are substantially the same in structure, are taken in the form of solenoid valves operable, on a control signal fed thereto from the control unit 22, to occupy one of two positions. The first or closed position, illustrated in FIG. 1, is occupied in the absence of the control signal to hold the braking fluid pressure $P_{FL}$, $P_{FR}$ in the corresponding one of the wheel cylinders $12_{FL}$ and $12_{FR}$. The second or open position is encountered in the presence of the control signal to reduce the braking fluid pressure in the corresponding wheel cylinder. Similarly, the rear road wheel pump $14_R$ has an exhaust or discharge port connected through a conduit $16_R$ to pressure increasing valves $18_{RL}$ and $18_{RR}$ and hence to the respective wheel cylinders $12_{RL}$ and $12_{RR}$. A check valve $20_{RL}$ is connected in parallel with the pressure increasing valve $18_{RL}$ to permit flow only toward the wheel cylinder $12_{FL}$ while preventing back flow. A check valve $20_{RR}$ is connected in parallel with the pressure increasing valve $18_{RR}$ to permit flow only toward the wheel cylinder $12_{RR}$ while preventing back flow. The pressure increasing valves $18_{RL}$ and $18_{RR}$, which are substantially the same in structure, are taken in the form of solenoid valves operable, on a control signal fed thereto from the control unit 22, to occupy one of two positions. The first or open position, illustrated in FIG. 1, is occupied in the absence of the control signal to increase the braking fluid pressure $P_{RL}$, $P_{RR}$ furnished to the corresponding one of the wheel cylinders $12_{RL}$ and $12_{RR}$. The second or closed position is encountered in the presence of the control signal to hold the braking fluid pressure in the corresponding wheel cylinder. The rear road wheel pump $14_R$ has an intake or suction port connected through a conduit $17_R$ to pressure reducing valves $19_{RL}$ and $19_{RR}$ and hence to the respective wheel cylinders $12_{RL}$ and $12_{RR}$. The pressure reducing valves $19_{RL}$ and $19_{RR}$, which are substantially the same in structure, are taken in the form of solenoid valves operable, on a control signal fed thereto from the control unit 22, to occupy one of two positions. The first or closed position, illustrated in FIG. 1, is occupied in the absence of the control signal to hold the braking fluid pressure $P_{FL}$, $P_{RR}$ in the corresponding one of the wheel cylinders $12_{RL}$ and $12_{RR}$. The second or open position is encountered in the presence of the control signal to reduce the braking fluid pressure in the corresponding wheel cylinder. A reservoir $21_F$ is connected to the conduit $17_F$. The reservoir $21_F$ acts as an accumulator for accumulating the braking fluid pressure discharged through the pressure reducing valves $19_{FL}$ and $19_{FR}$. A reservoir $21_R$ is connected to the conduit $17_R$. The reservoir $21_R$ acts as an accumulator for accumulating the braking fluid pressure discharged through the pressure reducing valves $19_{RL}$ and $19_{RR}$.

The duty ratios of the control signals applied to the respective solenoid valves $18_{FL}$, $18_{FR}$, $18_{RR}$, $19_{FL}$, $19_{FR}$, $19_{RL}$ and $19_{RR}$ are repetitively determined from calculations performed by the control unit 22, these calculations being made based upon various conditions of the automotive vehicle that are sensed during its operation. These sensed conditions include braking fluid pressures $P_{FL}$, $P_{FR}$, $P_{RL}$ and $R_{RR}$, brake pedal depressing force $F_p$, vehicle longitudinal acceleration $X_q$, vehicle lateral acceleration $Y_g$, engine speed Ne, turbine speed $N_T$ and road wheel speeds $VW_{FL}$, $VW_{FR}$, $VW_{RL}$ and $VW_{RL}$. Thus, braking fluid pressure sensors $23_{FL}$, $23_{FR}$, $23_{RL}$ and $23_{RR}$, a brake pedal depressing force sensor 24, a vehicle longitudinal acceleration sensor 25, a vehicle lateral acceleration sensor 26, an engine speed sensor 27, a turbine speed sensor 28 and road wheel speed sensors 29 are connected to the control unit 22. The braking fluid pressure sensors $23_{FL}$, $23_{FR}$, $23_{RL}$ and $23_{RR}$ are positioned to sense the braking fluid pressures $P_{FL}$, $P_{FR}$, $P_{RL}$ and $P_{RR}$. The brake pedal depressing force sensor 24 is associated with the brake pedal 11 and it produces an electric signal indicative of the force $F_g$ of depression of the brake pedal 11. The vehicle longitudinal acceleration sensor 25 is mounted on the vehicle body to sense the longitudinal acceleration $X_q$ of the vehicle body and it produces an electric signal indicative of the sensed longitudinal acceleration $X_g$. The vehicle lateral acceleration sensor 26 is mounted on the vehicle body to sense the lateral acceleration $Y_g$ of the vehicle body and it produces an electric signal indicative of the sensed lateral acceleration $Y_q$. The engine speed sensor 27 is associated to the engine crankshaft and it produces a series of electrical pulses of a repetition rate proportional to the speed Ne of rotation of the engine crankshaft. The turbine speed sensor 28 is associated with the torque converter and it produces a series of electrical pulses of a repetition rate proportional to the speed $N_T$ of rotation of the turbine of the torque converter. Each of the road wheel speed sensors 29 is associated with a corresponding one of the road wheels and it produces a series of electrical pulses of a repetition rate proportional to the speed $VW_{FL}$, $VW_{FR}$, $VW_{RL}$ or $VW_{RL}$ of rotation of the corresponding road wheel. This pulse signal is fed from the road wheel speed sensor to a road wheel speed calculation circuit which uses the tire rotation radius of the corresponding road wheel to calculate the road wheel speed $VW_{FL}$, $VW_{FR}$, $VW_{RL}$ and $VW_{RL}$ in the form of the peripheral speed of the corresponding road wheel.

The control unit 22 employs a digital computer which includes an input interface circuit, a central processing unit (CPU), a read only memory (ROM), a random access memory (RAM) and an output interface circuit. The central processing unit communicates with the rest of the computer via a data bus. The input interface circuit includes an analog-to-digital converter which receives analog signals from various sensor and converts them into digital form for application to the central processing unit. The read only memory contains programs for operating the central processing unit and further contains appropriate data in the form of lookup tables used in calculating appropriate values for the duty ratios of the control signals applied to the solenoid valves. Control words specifying desired duty ratios are periodically transferred by the central processing unit to the output interface circuit which converts the received control words into corresponding control signals to the solenoid valves.

Figure 2:
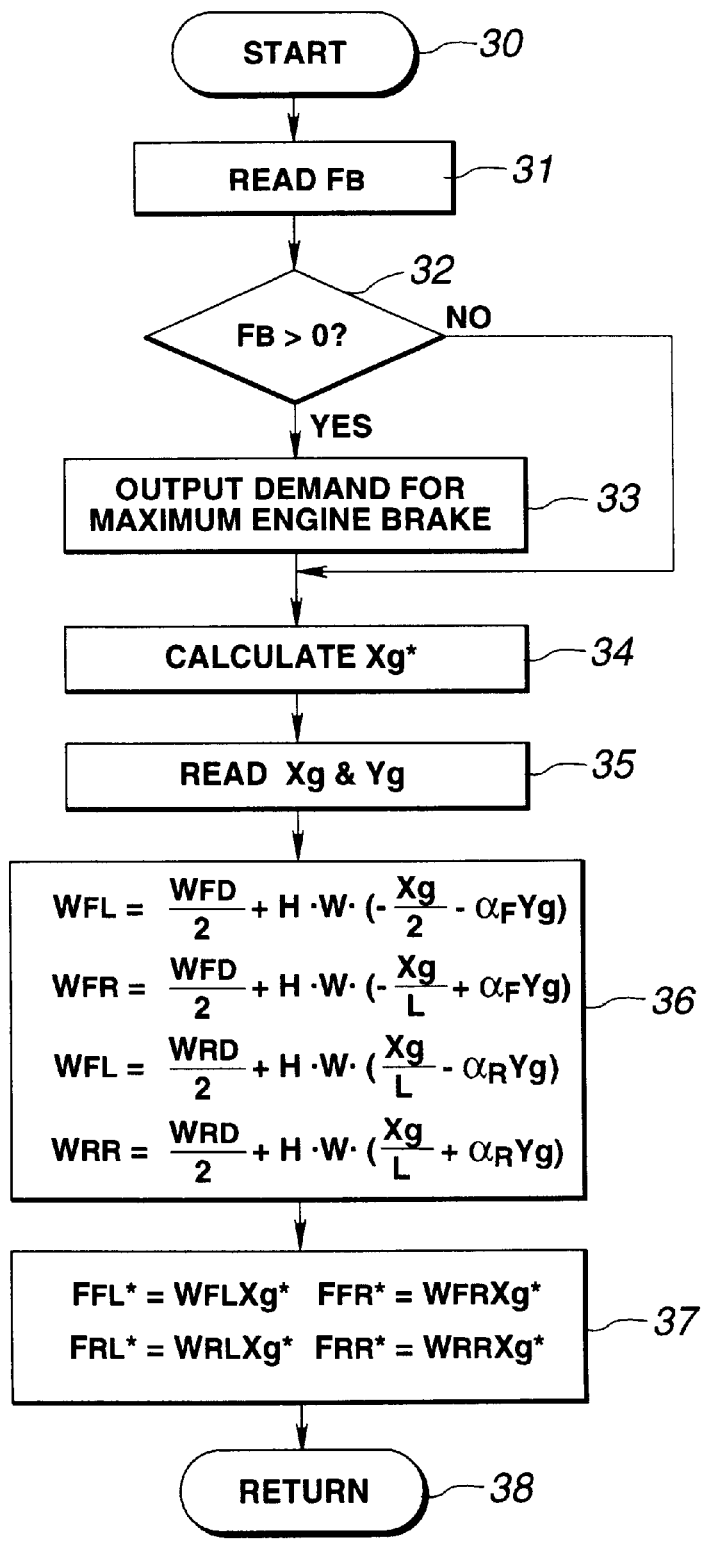
FIG. 2 is a flow diagram illustrating the programming of the digital computer as it is used for braking force control.
Figure 3:
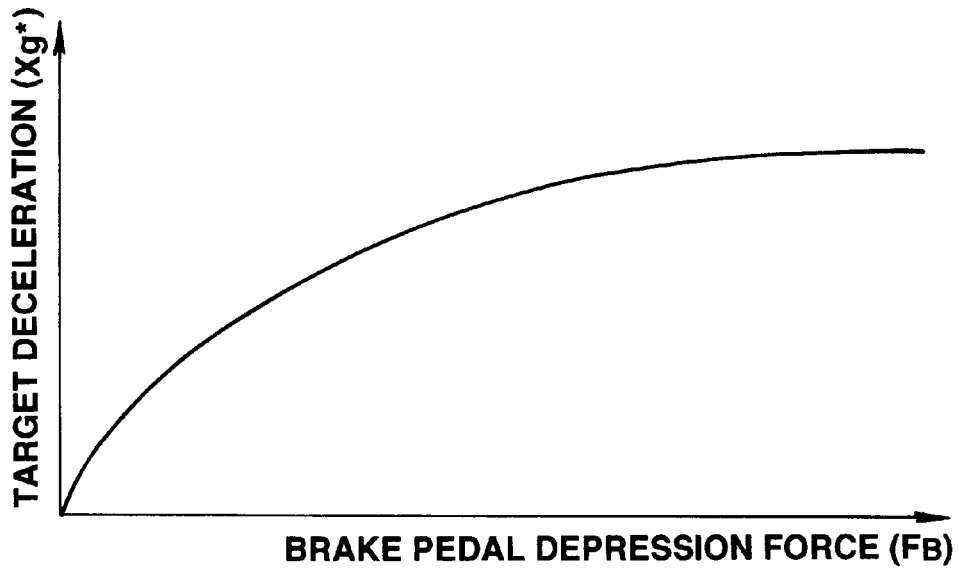
FIG. 3 is a graph of brake pedal depression force versus target vehicle deceleration.

FIG. 2 is a flow diagram illustrating the programming of the digital computer as it is used for the braking force control. The computer program is entered at the point 30. At the point 31 in the program, the force $F_S$ of depression of the brake pedal 11 is read into the computer memory. At the point 32, a determination is made as to whether or not the brake pedal depression force $F_B$ is greater than zero. If the answer to this question is "yes", then it means the application of braking to the vehicle and the program proceeds to the point 34. At the point 33, a signal indicative of a demand for a maximum engine brake is produced. This signal causes the control unit 22 to produce a maximum engine brake force by closing the engine throttle valve while at the same time engaging the clutch juxtaposed with the one-way clutch of the automatic transmission to be described later. It is to be understood that the control unit 22 may be arranged to produce an appropriate (not maximum) engine brake force by closing the engine throttle valve to a position before its closed position. At the point 34, a target vehicle deceleration value $X_g^*$ is calculated from a look-up table programmed into the computer. This look-up table specifies the target vehicle deceleration value $X_g^*$ as a function of brake pedal depressing force $F_B$, as shown in FIG. 3. At the point 35, the longitudinal and lateral vehicle acceleration $X_q$ and $Y_g$ are read into the computer memory. The longitudinal vehicle acceleration $X_q$ has a positive sign when the vehicle is accelerated forward. The lateral vehicle acceleration $Y_g$ has a positive sign when the vehicle is turning to the left. At the point 36, the loads $W_{FL}$, $W_{FR}$, $W_{RL}$ and $W_{RL}$ applied to the respective road wheels $12_{FL}$, $12_{FR}$, $12_{RL}$ and $12_{RL}$ are calculated as $$W_{FL}=(W_{FC}/2)+H\cdot W[(-X_g/L)-(\alpha_F\ Y_g)]$$

$$W_{FR}=(W_{FO}/2)+H\cdot W[(-X_g/L)+(\alpha_F\cdot Y_g)]$$

$$W_{RL}=(W_{RO}/2)+H\cdot W[(X_g/L)-(\alpha_R\cdot Y_g)]$$

$$W_{RL}=(W_{RO}/2)+H\cdot W[(X_g/\ L)+(\alpha_F\cdot Y_g)]$$

where $W_{FO}$ is the load applied to the front-left and -right road wheels when the vehicle is at rest, $W_{RO}$ is the load applied to the rear-left and -right road wheels when the vehicle is at rest, H is the height with respect to the ground at the gravity center of the vehicle, W is the weight of the vehicle, L is the wheel base, $\alpha_F$ is the roll rigidity on the front road wheel side, and $\alpha_R$ is the roll rigidity on the rear road wheel side.

At the point 37, the target braking forces $F_{FL}^*$, $F_{FR}^*$, $F_{RL}^*$ and $F_{RR}^*$ for the respective road wheels $12_{FL}$, $12_{FR}$, $12_{RL}$ and $12_{RL}$ required to obtain the target vehicle deceleration $X_g^*$ are calculated as $$F_{FL}^*=W_{FL}\cdot X_q^*$$

$$F_{FR}^*=W_{FR}\cdot X_g^*$$

$$F_{RL}^*=W_{RL}\cdot X_q^*$$

$$F_{RR}^*=W_{RR}\cdot X_g^*$$

Following this the program proceeds to the end point 38.

Figure 4:
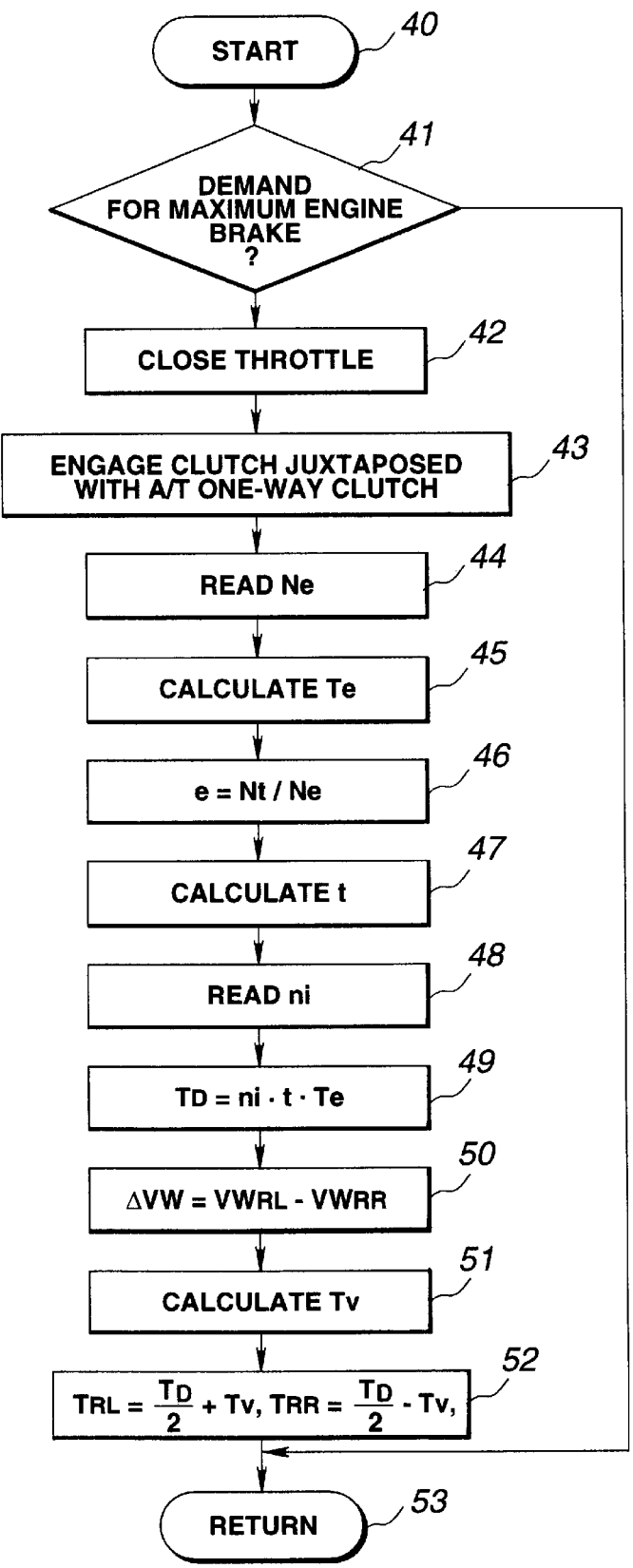
FIG. 4 is a flow diagram illustrating the programming of the digital computer as it is used to produce the maximum engine brake force and calculate the traction road wheel torque.

FIG. 4 is a flow diagram illustrating the programming of the digital computer as it is used to produce the maximum engine brake force and calculate the traction road wheel torque. The computer program is entered at the point 40. At the point 41 in the program, a determination is made as to whether or not a demand occurs for the maximum engine brake force. If the answer to this question is "yes", then the program proceeds to the point 42. Otherwise, it means the absence of vehicle braking and the program proceeds to the point 53 where the computer program is returned to the point 41. At the point 42, a command is produced to fully close the engine throttle valve. At the point 43, a command is produced to engage the clutch juxtaposed with the one-way clutch of the automatic transmission. The maximum engine brake force is produced through these steps at the points 42 and 43.

Figure 5:
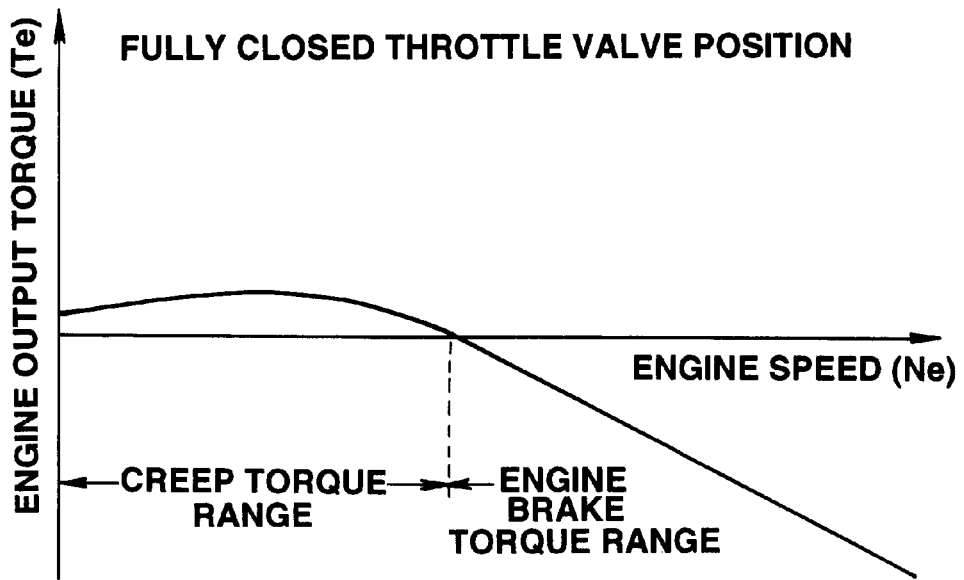
FIG. 5 is a graph of engine speed versus engine output torque.

At the point 44 in the program, the engine speed Ne is read into the computer memory. At the point 45, the engine torque Te is calculated from the look-up table programmed into the computer. This look-up table specifies the engine torque Te as a function of engine speed Ne, as shown in FIG. 5. FIG. 5 shows the engine output torque Te with respect to the engine speed Ne. As can be seen from FIG. 5, the engine operating conditions are in a creep torque range where the engine output torque Te is positive at low engine speeds Ne and in a engine brake torque range where the engine output torque Te is negative at high engine speeds Ne.

Figure 6:
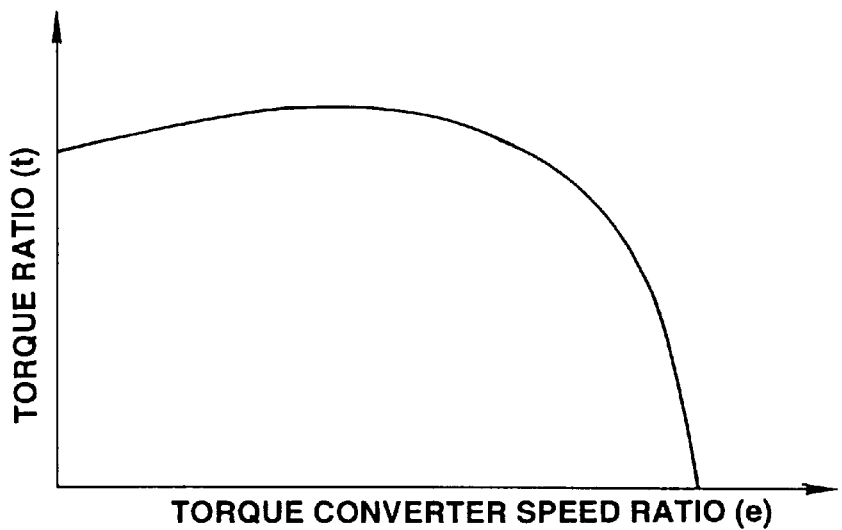
FIG. 6 is a graph of torque converter speed ratio versus torque ratio.

At the point 46 in the program, the speed ratio e of the toque converter interposed between the engine and the automatic transmission is calculated as $e=N_T/Ne$ where $N_T$ is the torque converter output speed (turbine speed) and Ne is the torque converter input speed (engine speed). At the point 47, the torque ratio t of the torque converter is calculated from the look-up table programmed into the computer. This look-up table defines the torque ratio t as a function of torque converter speed ratio e, as shown in FIG. 6. At the point 48, the gear ratio ni selected in the automatic transmission is read into the computer program. At the point 49, the drive torque $T_D$ transmitted from the automatic transmission to the respective road wheels is calculated as $T_D=ni \cdot t \cdot Te$ where ni is the read gear ratio, t is the calculated torque ratio and Te is the calculated engine output torque.

Figure 7:
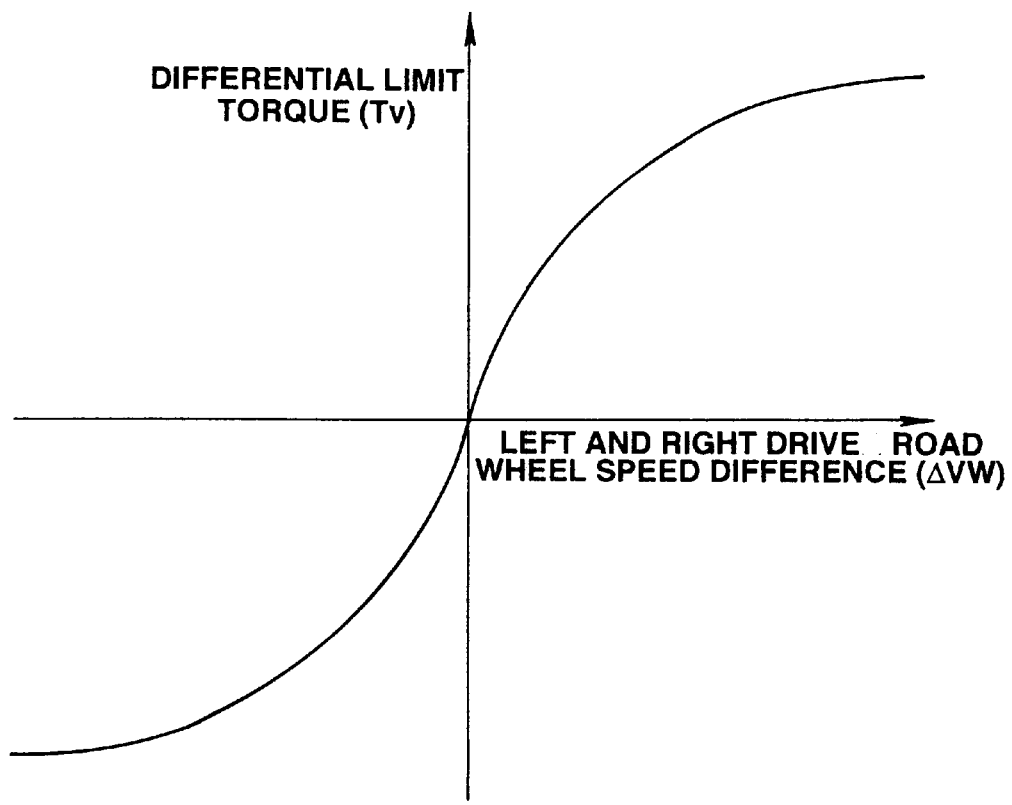
FIG. 7 is a graph of left and right traction road wheel speed difference versus differential limit torque.

At the point 50 in the program, the road wheel speed difference $\Delta VW$ between the left and right traction road wheels (rear-left and -right road wheels) is calculated as $\Delta VW=VW_{RL}-VW_{RR}$ where $VW_{RL}$ is the rear-left road wheel speed and $VW_{RR}$ is the rear-right road wheel speed. At the point 51, the differential limit torque $T_V$ produced from the viscous coupling type differential gear through which the torque transmitted from the automatic transmission is distributed to the left and right traction road wheels (rear-left and -right road wheels) is calculated from the look-up table programmed into the computer. This look-up table defines the differential limit torque $T_v$ as a function of traction road wheel speed difference $\Delta VW$, as shown in FIG. 7. At the point 52, the left and right traction road wheel (rear-left and -right road wheel) drive torque $T_{RL}$ and $T_{RR}$ are calculated as $T_{RL}=(T_D/2)+T_v$ $T_{RR}=(T_D/2)-T_v$ Following this, the program proceeds to the point 53 where the computer program is returned to the point 41.

Figure 8:
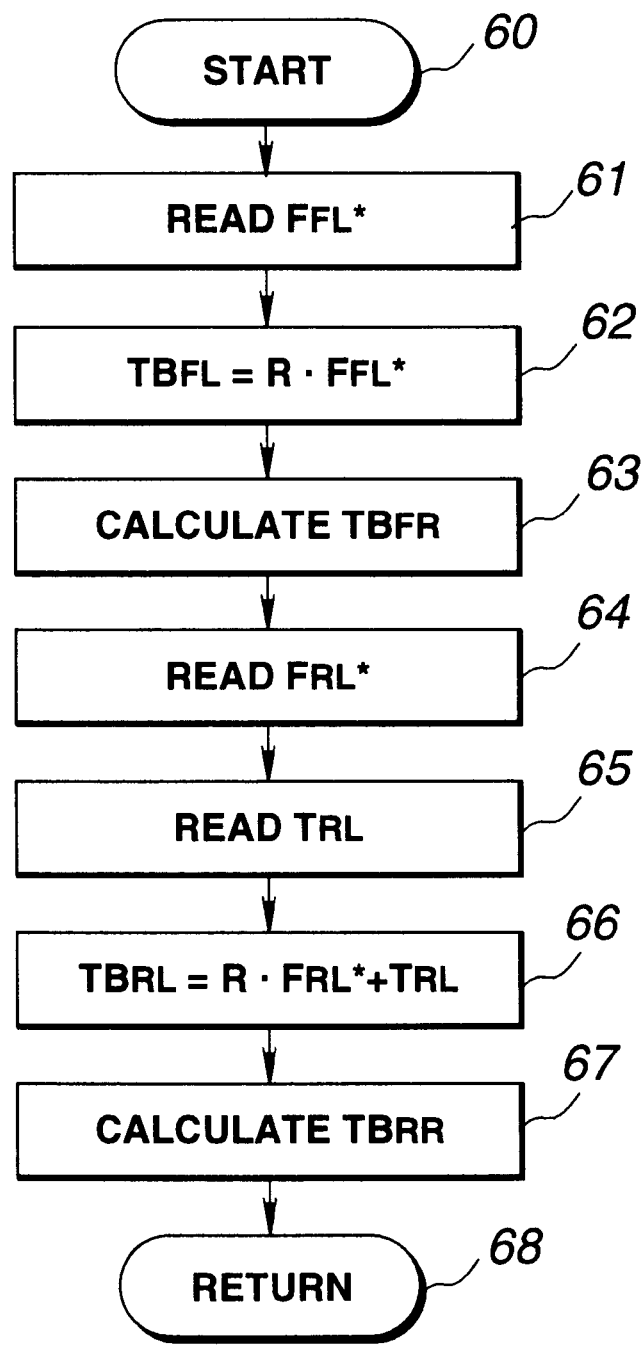
FIG. 8 is a flow diagram illustrating the programming of the digital computer as it is used to calculate the target rear-right road wheel brake torque.

FIG. 8 is a flow diagram illustrating the programming of the digital computer as it is used to calculate the target rear-right road wheel brake torque $TB_{RR}$. The computer program s entered at the point 60. At the point 61 in the program, the target front-left braking force $F_{FL}^*$, which is calculated at the point 37 of the flow diagram of FIG. 2, is read into the computer memory. At the point 62, the target front-left brake torque $TB_{FL}$ is calculated as $TB_{FL} \approx R \cdot F_{FL}^*$ where R is the radius of rotation of the front-left road wheel and $F_{FL}^*$ is the target front-left braking force. At the point 63, the target front-right brake torque $TB_{FR}$ is calculated as $TB_{FR}=R \cdot F_{FR}^*$ where R is the radius of rotation of the front-right road wheel and $F_{FR}^*$ is the target front-right braking force. At the point 64, the target rear-left braking force $F_{KL}^*$, which is calculated at the point 37 of FIG. 2, is read into the computer memory. At the point 65, the rear-left road wheel drive torque $T_{RL}$, which is calculated at the point 52 of FIG. 4, is read into the computer memory. At the point 66, the target rear-left brake torque $TB_{RL}$ is calculated as $TB_{RL}=R \cdot F_{RL}^*+T_{RL}$ where R is the radius of rotation of the rear-left road wheel, $F_{RL}^*$ is the target rear-left braking force, and $T_{RL}$ is the rear-left road wheel drive torque. At the point 67, the target rear-right brake torque $TB_{RR}$ is calculated as $TB_{RR}=F \cdot F_{RR}^*+T_{RR}$ where R is the radius of rotation of the rear-right road wheel, $F_{RR}^*$ is the target rear-right braking force and $T_{RR}$ is the rear-right road wheel drive torque. Following this, the program proceeds to the point 68 where the computer program is returned to the point 61.

The target rear-left and -right road wheel brake torque $TB_{RL}$ and $TB_{RR}$ correspond to the target rear-left and-right braking forces $F_{RL}^*$ and $F_{RR}^*$ calculated to produce the target deceleration $X_g^*$, respectively. The target rear-left and -right braking forces $F_{RL}^*$ and $F_{RR}^*$ are corrected by the rear-left and -right drive torque $T_{RL}$ and $T_{RR}$ to calculate the target rear-left and -right road wheel brake torque $TB_{RL}$ and $TB_{RR}$. Since the rear-left and -right drive torque $T_{RL}$ and $T_{RR}$ are positive when the drive torque $T_{RL}$ and $T_{RR}$ are in the creep torque range (FIG. 5) and negative when the drive torque $T_{RL}$ and $T_{RR}$ are in the engine brake torque range (FIG. 5), the target rear-left and -right road wheel brake torque $TB_{RL}$ and $TB_{RR}$ are increased from the values corresponding to the target rear-left and -right braking forces $F_{RL}^*$ and $F_{RR}^*$ when the drive torque $T_{RL}$ and $T_{RR}$ are in the creep torque range and decreased from the values corresponding to the target rear-left and-right braking forces $F_{RL}^*$ and $F_{RR}^*$ when the drive torque $T_{RL}$ and $T_{RR}$ are in the engine brake torque range.

Figure 9:
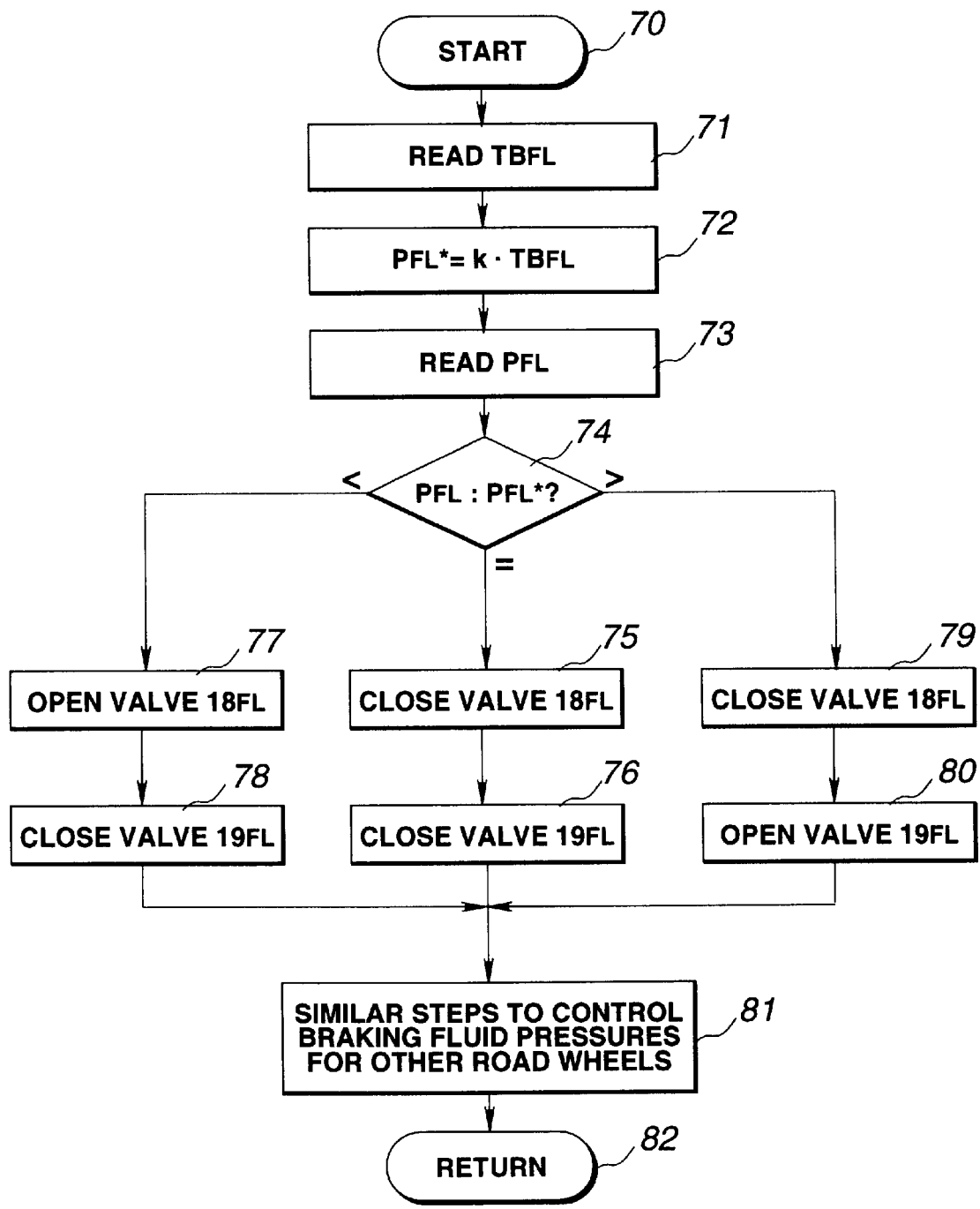
FIG. 9 is a flow diagram illustrating the programming of the digital computer as it is used for braking fluid pressure control.

FIG. 9 is a flow diagram illustrating the programming of the digital computer as it is used for the braking fluid pressure control. The computer program is entered at the point 70. At the point 71 in the program, the target front-left road wheel brake torque $TB_{FL}$ is read into the computer memory. At the point 72, the target front-left braking fluid pressure $P_{FL}^*$ required to produce the target brake torque $TB_{FL}$ is calculated as $P_{FL}^*=k \cdot TB_{FL}$ where k is a constant determined by the area on which the wheel cylinder braking fluid pressure is applied, the friction factor of the brake paid, the caliper radius, etc. At the point 73, the sensed front-left road wheel braking fluid pressure $P_{FL}$ is read into the computer memory.

At the point 74, a determination is made as to whether the sensed front-left road wheel braking fluid pressure $P_{FL}$ is less than equal to, or greater than the target front-left road wheel braking fluid pressure $P_{FL}^*$. If the sensed front-left road wheel braking fluid pressure $P_{FL}$ is equal to the target front-left road wheel braking fluid pressure $P_{FL}^*$, then a command is produced to close the solenoid valve $18_{FL}$ at the point 75 and a command is produced to close the solenoid $19_{FL}$ at the point 76. As a result, the front-left road wheel braking fluid pressure $P_{FL}$ remains unchanged. Following this, the program proceeds to the point 81. If the sensed front-left road wheel braking fluid pressure $P_{FL}$ is less than the target front-left road wheel braking fluid pressure $P_{FL}{}^*$, then a command is produced to open the solenoid valve $18_{FL}$ at the point 77 and a command is produced to close the solenoid $19_{FL}$ at the point 78. As a result, the front-left road wheel braking fluid pressure $P_{FL}$ is increased. Following this, the program proceeds to the point 81. If the sensed front-left road wheel braking fluid pressure $P_{FL}$ is greater than the target front-left road wheel braking fluid pressure $P_{FL}{}^*$, then a command is produced to close the solenoid valve $18_{FL}$ at the point 79 and a command is produced to open the solenoid $19_{FL}$ at the point 80. As a result, the front-left road wheel braking fluid pressure $P_{FL}$ is decreased. Following this, the program proceeds to the point 81. At the point 81, steps similar to the steps 71 to 80 are performed for the braking fluid pressure control for the front-right, rear-left and rear-right road wheels. Upon completion of these braking fluid pressure controls, the program proceeds to the point 82 where the computer program is returned to the point 71.

The braking fluid pressures for the respective road wheels are controlled to their target values required to obtain the respective target brake torque calculated during the execution of the program of FIG. 8. The target brake torque for the follower (front-left and -right) road wheels corresponds to the respective loads $W_{FL}$ and $W_{FR}$ required to obtain the target vehicle deceleration $X_d{}^*$ corresponding to the force $F_B$ of the operator's brake pedal depression. The target brake torque for the traction (rear-left and -right) road wheels corresponds to the values to which the loads $W_{FL}$ and $W_{FR}$ required to obtain the target vehicle deceleration $X_d{}^*$ corresponding to the force $F_B$ of the operator's brake pedal depression are corrected for the road wheel drive torque $T_{RL}$ and $T_{RR}$. It is, therefore, possible to control the braking force for each of the road wheels according to the load exerted on the corresponding road wheel in the presence of vehicle braking and also to perform appropriate braking force control free from the influence of the road wheel drive torque for each of the traction road wheels. Consequently, the braking forces remain balanced not only between the traction and follower road wheels, but also between the left and right road wheels. This is effective to retain stable vehicle behaviors even when the vehicle is running on a road surface having a low friction factor or turning.

As described in connection with the point 66 of FIG. 8, the control unit 22 determines the target traction road wheel brake torque by decreasing the target brake torque corresponding to the loads $W_{RL}$ and $W_{RR}$ distributed to the rear-left and -right road wheels when the rear-left and -right road wheel drive torque $T_{RL}$ and $T_{RR}$ are in the engine brake torque range and it determines the target traction road wheel brake torque by increasing the target brake torque corresponding to the loads $W_{RL}$ and $W_{RR}$ distributed to the rear-left and -right road wheels when the rear-left and -right road wheel drive torque $T_{RL}$ and $T_{RR}$ are in the creep torque range. It is, therefore, possible to avoid the tendency toward locked conditions which may occur when the braking forces for the rear-left and -right road wheels increase to an excessive extent because of the engine brake torque and degraded braking performance which may occur when the braking forces for the rear-left and -right road wheels decrease to an excessive extent because of the creep torque.

The control unit 22 produces a demand for the maximum engine brake during the braking force control, as described in connection with the points 32 and 33 of FIG. 2, and close the engine throttle valve while at the same time engaging the clutch juxtaposed with the one-way clutch of the automatic transmission, as described in connection with the points 42 and 43 of FIG. 4. Thus, the maximum engine brake is applied to the vehicle during the operator's operation for application of braking to the vehicle. This is effective to reduce the load applied to the road wheel braking system.

The load exerted on each of the road wheels is calculated based on the vehicle longitudinal and lateral accelerations $X_g$ and $Y_q$ as described in connection with the point 36 of FIG. 2. It is, therefore, possible to calculate the load applied to each of the road wheels with high accuracy under any vehicle operating conditions. This is effective to ensure that the braking force for each of the road wheels can be controlled in good correspondence to the load applied to the corresponding road wheel.

Figure 10:
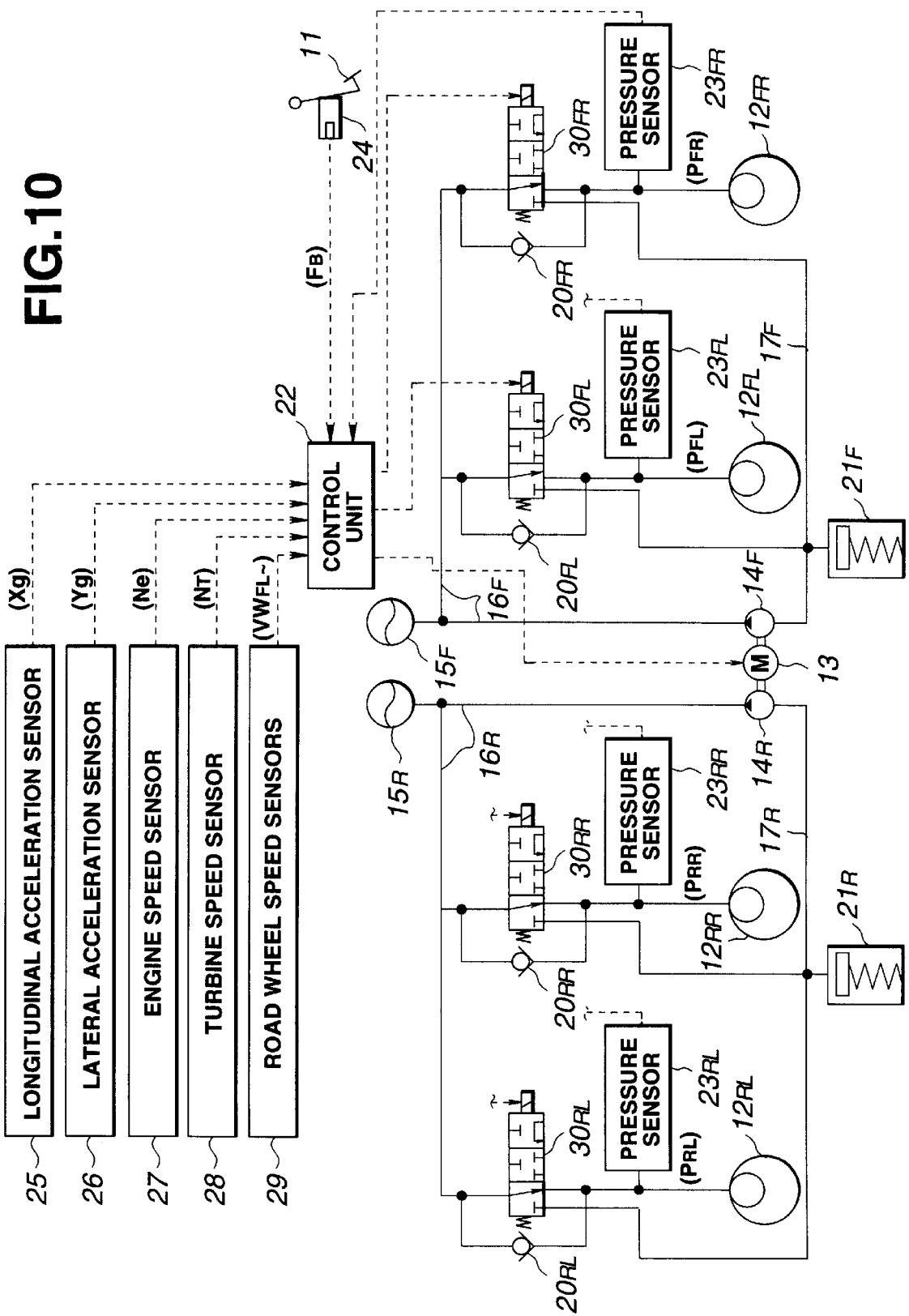
FIG. 10 is a schematic diagram showing another embodiment of the braking force control apparatus of the invention.

Referring to FIG. 10, there is shown another embodiment of the braking force control apparatus of the invention. This embodiment is substantially the same as the first embodiment of FIG. 1 except that a three-port, three-position change-over valve $30_{FL}$ is used in place of the two-port, two-position change-over valves $18_{FL}$ and $19_{FL}$, a three-port, three-position change-over valve $30_{FR}$ is used in place of the two-port, two-position change-over valves $18_{FR}$ and $19_{FR}$, a three-port, three-position change-over valve $30_{RL}$ is used in place of the two-port, two-position change-over valves $18_{RL}$ and $19_{RL}$ and a three-port, three-position change-over valve $30_{RR}$ is sued in place of the two-port, two-position change-over valves $18_{RR}$ and $19_{RR}$. Accordingly, like reference numerals have been applied to FIG. 10 with respect to the equivalent components in FIG. 1.

The change-over valve $30_{FL}$ has an inlet port connected to the conduit $16_F$, a first outlet port connected to the conduit $17_F$, and a second outlet port connected to the front-left road wheel cylinder $12_{FL}$. The change-over valve $30_{FL}$ operates on a control signal fed thereto from the control unit 22, to occupy one of three positions. The first position, illustrated in FIG. 1, is occupied in the absence of the control signal to make a connection between the input port and the second inlet port so as to increase the braking fluid pressure $P_{FL}$ furnished to the wheel cylinder $12_{FL}$. The second position is encountered in the presence of the control signal having a first level to disconnect the inlet port from the first and second outlet ports so as to hold the braking fluid pressure $P_{FL}$ in the wheel cylinder $12_{FL}$. The third position is encountered in the presence of the control signal having a second level higher than the first level to make a connection between the first and second outlet ports so as to decrease the braking fluid pressure $P_{FL}$ furnished to the wheel cylinder $12_{FL}$. Similarly, the change-over valve $30_{FR}$ has an inlet port connected to the conduit $16_F$, a first outlet port connected to the conduit $17_F$, and a second outlet port connected to the front-left road wheel cylinder $12_{FR}$. The change-over valve $30_{FR}$ operates on a control signal fed thereto from the control unit 22, to occupy one of three positions. The first position, illustrated in FIG. 1, is occupied in the absence of the control signal to make a connection between the input port and the second inlet port so as to increase the braking fluid pressure $P_{FR}$ furnished to the wheel cylinder $12_{FR}$. The second position is encountered in the presence of the control signal having a first level to disconnect the inlet port from the first and second outlet ports so as to hold the braking fluid pressure $P_{FR}$ in the wheel cylinder $12_{FR}$. The third position is encountered in the presence of the control signal having a second level higher than the first level to make a connection between the first and second outlet ports so as to decrease the braking fluid pressure $P_{FR}$ furnished to the wheel cylinder $12_{FR}$. Likewise, the change-over valve $30_{RL}$ has an inlet port connected to the conduit $16_F$, a first outlet port connected to the conduit $17_F$, and a second outlet port connected to the front-left road wheel cylinder $12_{RL}$. The change-over valve $30_{RL}$ operates on a control signal fed thereto from the control unit 22, to occupy one of three positions. The first position, illustrated in FIG. 1, is occupied in the absence of the control signal to make a connection between the input port and the second inlet port so as to increase the braking fluid pressure $P_{RL}$ furnished to the wheel cylinder $12_{RL}$. The second position is encountered in the presence of the control signal having a first level to disconnect the inlet port from the first and second outlet ports so as to hold the braking fluid pressure $P_{RL}$ in the wheel cylinder $12_{RL}$. The third position is encountered in the presence of the control signal having a second level higher than the first level to make a connection between the first and second outlet ports so as to decrease the braking fluid pressure $P_{RL}$ furnished to the wheel cylinder $12_{RL}$. Similarly, the change-over valve $30_{RR}$ has an inlet port connected to the conduit $16_F$, a first outlet port connected to the conduit $17_F$, and a second outlet port connected to the front-left road wheel cylinder $12_{RR}$. The change-over valve $30_{RR}$ operates on a control signal fed thereto from the control unit 22, to occupy one of three positions. The first position, illustrated in FIG. 1, is occupied in the absence of the control signal to make a connection between the input port and the second inlet port so as to increase the braking fluid pressure $P_{RR}$ furnished to the wheel cylinder $12_{RR}$. The second position is encountered in the presence of the control signal having a first level to disconnect the inlet port from the first and second outlet ports so as to hold the braking fluid pressure $P_{RR}$ in the wheel cylinder $12_{RR}$. The third position is encountered in the presence of the control signal having a second level higher than the first level to make a connection between the first and second outlet ports so as to decrease the braking fluid pressure $P_{RR}$ furnished to the wheel cylinder $12_{RR}$.

Figure 11:
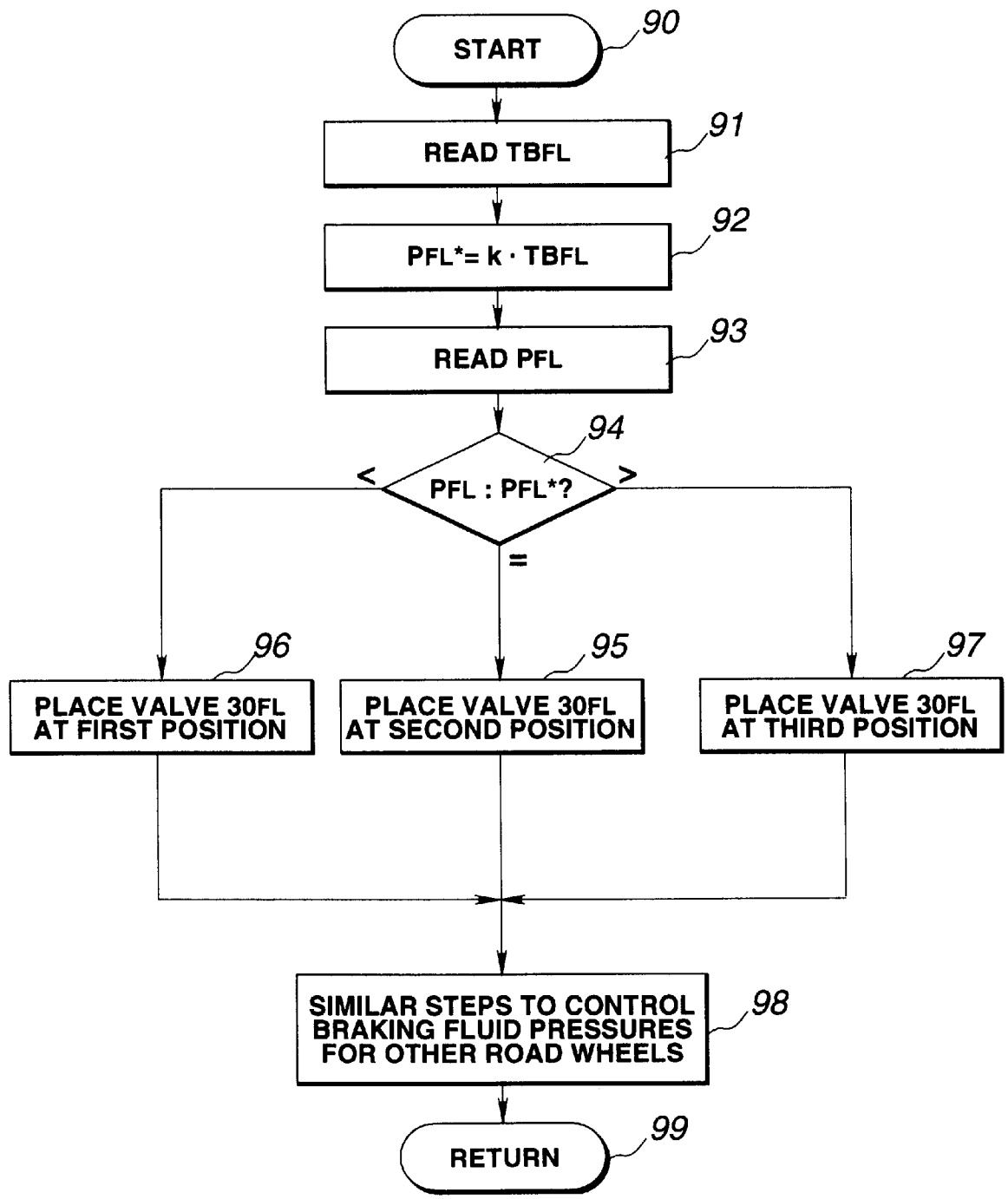
FIG. 11 is a flow diagram illustrating the programming of the digital computer as it is used for braking fluid pressure control.

FIG. 11 is a flow diagram illustrating the programming of the digital computer as it is used to control the solenoid valves $30_{FL}$, $30_{FR}$, $30_{RL}$ and $30_{RR}$ for the braking fluid pressure control. The computer program is entered at the point 90. At the point 91 in the program, the target front-left road wheel brake torque $TB_{FL}$ is read into the computer memory. At the point 92, the target front-left braking fluid pressure $P_{FL}^*$ required to produce the target brake torque $TB_{FL}$ is calculated as $P_{FL}^* = k \cdot TB_{FL}$ where k is a constant determined by the area on which the wheel cylinder braking fluid pressure is applied, the friction factor of the brake pad, the caliper radius, etc. At the point 93, the sensed front-left road wheel braking fluid pressure $P_{FL}$ is read into the computer memory.

At the point 94, a determination is made as to whether the sensed front-left road wheel braking fluid pressure $P_{FL}$ is less than, equal to, or greater than the target front-left road wheel braking fluid pressure $P_{FL}^*$. If the sensed front-left road wheel braking fluid pressure $P_{FL}$ is equal to the target front-left road wheel braking fluid pressure $P_{FL}^*$, then the program proceeds to the point 95 where a command is produced to place the solenoid valve $30_{FL}$ in its second position so as to hold the front-left road wheel braking fluid pressure $P_{FL}$ unchanged. Following this, the program proceeds to the point 98. If the sensed front-left road wheel braking fluid pressure $P_{FL}$ is less than the target front-left road wheel braking fluid pressure $P_{FL}^*$, then the program proceeds to the point 96 where a command is produced to place the solenoid valve $30_{FL}$ at its first position so as to increase the front-left road wheel braking fluid pressure $P_{FL}$. If the sensed front-left road wheel braking fluid pressure $P_{FL}$ is greater than the target front-left road wheel braking fluid pressure $P_{FL}^*$, then the program proceeds to the point 97 where a command is produced to place the solenoid valve $30_{FL}$ at its third position so as to decrease the front-left road wheel braking fluid pressure $P_{FL}$. Following this, the program proceeds to the point 98. At the point 98, steps similar to the steps 91 to 97 are performed for the braking fluid pressure control for the front-right, rear-left and rear-right road wheels. Upon completion of these braking fluid pressure controls, the program proceeds to the point 99 where the computer program is returned to the point 91.

While the invention has been described in connection with a hydraulic braking system, it is to be understood that the invention can be used with other types of braking systems. For example, the invention is applicable to magnetic braking systems.

What is claimed is:

1. A braking force control apparatus for an automotive vehicle drive train including an engine and at least one traction road wheel driven by the engine, the apparatus comprising:

a source of braking fluid;

a hydraulic circuit fluidly disposed between said source of braking fluid and the at least one traction road wheel;

said hydraulic circuit including an electromagnetic valve that controls a supply of braking fluid to and discharge of braking fluid from the at least one traction road wheel in response to a control signal to establish braking pressure applied to the at least one traction road wheel; and a control unit operatively coupled with said electromagnetic valve; wherein said control unit determines a target braking force to be applied to the at least one traction road wheel in response to an operator's brake demand;

said control unit determines a target brake torque in response to said determined target braking force and a drive torque applied to the at least one traction road wheel;

said control unit determines a desired braking pressure in response to said determined target brake torque;

said control unit develops said control signal in response to said determined desired braking pressure;

said control unit applies said control signal to said electromagnetic valve to adjust braking pressure to said determined desired braking pressure; and said control unit determines said target brake torque such that said target brake torque is proportional to the sum of said determined target braking force and the drive torque applied to the at least one traction road wheel.

2. A braking force control apparatus as claimed in claim 1, wherein said electromagnetic valve includes a first two-position solenoid operated valve that has a supply position and a hold position, and a second two-position solenoid operated valve that has a discharge position and a hold position.

3. A braking force control apparatus as claimed in claim 1, wherein said electromagnetic valve includes a three-position solenoid operated valve that has a supply position, a discharge position, and a hold position.

4. A control method for an automotive vehicle hydraulic brake system including a first electromagnetic valve responsive to a first control signal for controlling a supply of braking fluid to and discharge of braking fluid from at least one traction road wheel that is driven by a vehicle engine, and a second electromagnetic valve responsive to a second control signal for controlling a supply of braking fluid to and discharge of braking fluid from at least one follower road wheel, and a control unit developing the first and second control signals in response to an operator's brake demand, the control method comprising the steps of:

determining a drive torque applied to the at least one traction road wheel;

determining a target vehicle deceleration in response to the operator's brake demand;

determining a first target braking force to be applied to the at least one traction road wheel in response to said determined target vehicle deceleration;

determining a second target braking force to be applied to the at least one follower road wheel in response to said determined target vehicle deceleration;

determining a first target brake torque in response to said determined first target braking force and said determined drive torque;

determining a second target brake torque in response to said determined second target braking force;

determining a first target braking pressure in response to said determined first target brake torque;

determining a second target braking pressure in response to said determined second target brake torque;

developing a first control signal in response to said determined first target braking pressure;

developing a second control signal in response to said determined second target braking pressure; and applying said first and second control signals to the first and second electromagnetic valves.

5. A braking force control apparatus for use with an automotive vehicle supported on traction and follower road wheels, comprising:

means for sensing a driver's force exerted to apply braking to the vehicle;

means for calculating a target vehicle deceleration based on the sensed driver's force;

means for detecting a longitudinal acceleration of the vehicle;

means for sensing a lateral vehicle acceleration;

means for calculating loads applied to the respective traction and follower road wheels on the basis of the longitudinal and lateral vehicle accelerations;

means for calculating target braking forces required for the respective traction and follower road wheels to achieve the target vehicle deceleration based on said loads applied to the respective traction and follower road wheels;

means for calculating target road wheel brake torque for the respective traction and follower road wheels based on the calculated target braking forces;

means for calculating drive torque for the respective traction road wheels;

means for correcting, based on the calculated drive torque for the respective traction road wheels, the corresponding calculated target road wheel brake torque for the respective traction road wheels and thereby calculating target traction road wheel brake torque; and means for controlling a supply of braking fluid to the respective traction and follower road wheels to achieve the calculated target road wheel brake torque for the respective follower road wheels and the calculated target traction road wheel brake torque for the respective traction road wheels.

6. The braking force control apparatus as claimed in claim 5, wherein the target traction road wheel brake torque correcting means includes means for decreasing the calculated target road wheel brake torque for the respective traction road wheels to obtain the respective target traction road wheel brake torque when the calculated drive torque for the respective traction road wheels are torque resulting from engine brake and means for increasing the calculated target road wheel brake torque to obtain the respective target traction road wheel brake torque when the calculated drive torque for the respective traction road wheels are creep torque.

7. The braking force control apparatus as claimed in claim 6, wherein the target road wheel braking force calculating means includes means for sensing a longitudinal vehicle acceleration, means for sensing a lateral vehicle acceleration, and means for calculating the loads shared by the respective road wheels based on the longitudinal and lateral vehicle accelerations.

8. The braking force control apparatus as claimed in claim 5, wherein the target drive torque calculating means includes means for calculating an engine output torque as a function of engine load and engine speed, means for calculating a differential gear differential limit torque based on a difference between left and right traction road wheel speeds, and means for calculating drive torque for the respective traction road wheels based on the engine output torque and the differential limit torque.

9. In an automotive vehicle control system including an engine with a throttle which opens in degrees, a torque converter drivingly coupled with the engine, an automatic transmission having an input shaft drivingly coupled with the torque converter and an output shaft, a differential drivingly coupled with the output shaft of the automatic transmission, a first pair of left and right road wheels drivingly coupled with the differential, and a second pair of left and right road wheels, a first pair of left and right wheel cylinders associated with the first pair of road wheels, respectively;

a second pair of left and right wheel cylinders associated with the second pair of road wheels, respectively;

a brake pedal;

a first pump operable to delivery brake fluid for distribution to the first pair of left and right wheel cylinders;

a second pump operable to deliver brake fluid for distribution to the second pair of left and right wheel cylinders;

a motor operable to drive, in response to a command signal, said first and second pumps;

a plurality of solenoid valves for said wheel cylinders, respectively, and operable, in response to respective control signals, to alter brake pressure applied to said wheel cylinders, respectively; and a control unit operable to develop said command signal and said control signals for controlling said first and second pumps and said solenoid valves in response to a driver's brake demand, wherein said control unit determines target deceleration, to which the vehicle is to be subjected, as a predetermined function of the driver's brake demand;

said control unit determines load applied to each of the road wheels;

said control unit determines target braking force for each of the road wheels as a predetermined function of said determined target deceleration and said determined load thereon;

said control unit determines drive torque to which each of the left and right road wheels of the first pair is subjected;

said control unit determines target brake torque for each of the left and right road wheels of the first pair as a predetermined function of said determined drive torque therefor and said determined target braking force therefor;

said control unit determines target brake torque for each of the left and right road wheels of the second pair as a predetermined function of said determined target braking force therefor;

said control unit determines target brake pressure for each of the road wheels as a predetermined function of said determined target brake torque therefor;

said control unit compares, for each of the road wheels, said determined target brake pressure and a measure of brake pressure applied to said wheel cylinder thereof;

said control unit develops the control signals in response to results of the comparison, respectively; and said control unit applies the control signals to said plurality of solenoid valves, respectively.

10. The combination as claimed in claim 9, wherein, in determining target brake torque for each of the left and right road wheels of the first pair, the control unit effects decrement of said determined target brake torque by said determined drive torque when said determined drive torque is indicative of engine brake torque, while said control unit effects increment of said determined target brake torque by said determined drive torque when said determined drive torque is indicative of creep torque.

11. The combination as claimed in claim 9, wherein said control unit closes the throttle in response to the driver's brake demand.

12. The combination as claimed in claim 9, wherein, in determining drive torque to which each of the left and right road wheels of the first pair is subjected to, the control unit retrieves stored performance characteristic curves of the engine versus a measure of engine load and a measure of engine speed to determine output torque, and determines differential limit torque produced by the differential in response to a difference between measures of wheel speeds of the left and right road wheels of the first pair, and determines drive torque for each of the left and right road wheels of the first pair as a predetermined function of said determined output torque and said determined differential limit torque.

13. The combination as claimed in claim 9, further comprising means for measuring a longitudinal vehicle acceleration and means for measuring a lateral vehicle acceleration, wherein the control unit determines load applied to each of the road wheels as a predetermined function of the longitudinal vehicle acceleration and the lateral vehicle acceleration.

14. A control method for an automotive vehicle including an engine with a throttle which opens in degrees, a torque converter drivingly coupled with the engine, an automatic transmission having an input shaft drivingly coupled with the torque converter and an output shaft, a differential drivingly coupled with the output shaft of the automatic transmission, a first pair of left and right road wheels drivingly coupled with the differential, a second pair of left and right road wheels, a first pair of left and right wheel cylinders associated with the first pair of road wheels, respectively, a second pair of left and right wheel cylinders associated with the second pair of road wheels, respectively, a brake pedal, a first pump operable to deliver brake fluid for distribution to the first pair of left and right wheel cylinders, a second pump operable to deliver brake fluid for distribution to the second pair of left and right wheel cylinders, a motor operable to drive, in response to a command signal, said first and second pumps and a plurality of solenoid valves for said wheel cylinders, respectively, and operable, in response to respective control signals, to alter brake pressure applied to said wheel cylinders, respectively, the control method comprising the steps of:

determining target deceleration, to which the vehicle is to be subjected, as a predetermined function of a driver's brake demand;

determining load applied to each of the road wheels;

determining target braking force for each of the road wheels as a predetermined function of said determined target deceleration and said determined load thereon;

determining drive torque to which each of the left and right road wheels of the first pair is subjected;

determining target brake torque for each of the left and right road wheels of the first pair as a predetermined function of said determined drive torque therefor and said determined target braking force therefor;

determining target brake torque for each of the left and right road wheels of the second pair as a predetermined function of said determined braking force;

determining target brake pressure for each of the road wheels as a predetermined function of said determined target brake torque therefor;

comparing, for each of the road wheels, said determined target brake pressure and a measure of brake pressure applied to said wheel cylinder thereof;

developing the control signals in response to results of the comparison, respectively; and applying the control signals to said plurality of solenoid valves, respectively.

* * * * *